United States Patent [19]
Jimison et al.

[11] Patent Number: 5,404,748
[45] Date of Patent: Apr. 11, 1995

[54] METHOD AND APPARATUS FOR MINIMIZING HYDRODYNAMIC PRESSURE NOISE INTERFERENCE WITH A VALVE LEAKAGE TEST

[75] Inventors: Walter L. Jimison, Palo Alto; Craig S. Barker, San Carlos; Marc R. Bunyard, Milipitas, all of Calif.

[73] Assignee: Abbott Laboratories, Abbott Park, Ill.

[21] Appl. No.: 45,003

[22] Filed: Oct. 29, 1993

[51] Int. Cl.$^6$ .............................................. G01M 3/26
[52] U.S. Cl. .......................................... 73/40; 73/46
[58] Field of Search ............ 73/40, 46, 40.5 R, 49.2 T

[56] References Cited

U.S. PATENT DOCUMENTS

| | | | |
|---|---|---|---|
| 4,441,357 | 4/1984 | Kahn et al. | 73/40 |
| 4,715,214 | 12/1987 | Tveter et al. | 73/40 |
| 4,818,186 | 4/1989 | Pastrone et al. | 417/63 |
| 5,000,664 | 3/1991 | Lawless et al. | 417/63 |
| 5,264,833 | 11/1993 | Jeffers et al. | 73/40 |

*Primary Examiner*—Hezron E. Williams
*Assistant Examiner*—Michael J. Brock
*Attorney, Agent, or Firm*—Christensen, O'Connor, Johnson & Kindness

[57] ABSTRACT

Risk of hydrodynamic pressure noise interference with a valve leakage test conducted upon a plurality of valves within a pump assembly is minimized. A pressure sensor within the pump assembly produces a signal indicative of hydrodynamic pressure in fluid distal of an outlet valve of the pump. The signal produced by the pressure sensor is input to a microcontroller that controls the pump assembly. Prior to conducting the valve leakage test, the hydrodynamic pressure level of the fluid is sampled at a frequency that is at least twice that of the hydrodynamic noise. The microcontroller determines if a maximum of the samples of the hydrodynamic pressure level taken during a data interval is above a predetermined threshold. If so, the valve leakage test is suppressed until the maximum pressure level is below the predetermined threshold during a successive data interval. If the hydrodynamic pressure noise level fails to fall below the predetermined threshold within several data intervals, an alarm alerts an operator of a noise fault condition.

27 Claims, 4 Drawing Sheets

METHOD AND APPARATUS FOR MINIMIZING HYDRODYNAMIC PRESSURE NOISE INTERFERENCE WITH A VALVE LEAKAGE TEST

FIELD OF THE INVENTION

This invention generally relates to a pump assembly having a plurality of valves, and more specifically, to a pump with the capability to automatically conduct leakage tests on the plurality of valves before the pump is used, wherein the tests can be affected by hydrodynamic pressure noise.

BACKGROUND OF THE INVENTION

Disposable pump cassettes are frequently employed to infuse medicinal fluids into a patient. As described in U.S. Pat. Nos. 4,818,186 and 5,000,664, one type of disposable cassette includes a plastic housing having a front and rear portion, between which an elastomeric membrane is encapsulated. The housing has a plurality of ports through which rod-like actuators of a pump drive mechanism interact with the elastomeric membrane to control fluid flow through channels formed within the cassette housing. A pump plunger on the drive unit displaces the membrane to pressurize liquid trapped in a pumping chamber formed between the membrane and the back of the housing.

Through another port in the housing of the cassette, a pressure sensor rod impinges against the elastomeric membrane to sense the pressure of the fluid in a fluid passage that is adjacent an outlet port of the cassette. The pressure sensor rod is coupled to a strain gage pressure transducer that produces a signal indicative of the pressure of fluid at the outlet port. A microcontroller in the pump drive controls the pump plunger, actuator rods and pressure sensor to effect a desired rate of delivery of medicinal fluids to the patient, and in some units, is capable of selecting between a plurality of different sources by opening an appropriate selector valve adjacent one of a plurality of inlet ports in the cassette.

Significant leakage through the valves in the pump cassette can create a potentially harmful variation from the programmed quantity of medication delivered to a patient, or in the case of a leaking selector valve, may allow a medicinal fluid to freely flow through the pump cassette when infusion of the fluid into the patient is not desired. The pump assembly detects leakage of the valves by conducting a valve test upon the valves when the cassette is initially loaded into the pump drive and thereafter, each time that the pump is energized. Valve leakage is determined as a function of the signal produced by the pressure sensor. An alarm sounds if a leak is detected during the valve leakage test to alert an operator of the problem.

The pump assembly is connected to a patient by a tube set and catheter. Vibrations in the tubing occur during normal operation whenever the patient moves and/or the operator bumps or otherwise displaces the tubing. These motion induced vibrations create hydrodynamic pressure noise. The hydrodynamic pressure noise may be sufficiently great in amplitude to interfere with the valve leakage test. If the noise level causes a false alarm indicating valve leakage, fluid flow to the patient is interrupted while the operator tries to correct the problem. Alternatively, the noise level may obscure a true leakage problem. In view of the potential harm to the patient should false alarms frequently occur, there is clearly a need for minimizing the likelihood of hydrodynamic pressure noise interfering with the valve leakage test.

Prior to implementing the present invention, no attempt was made to prevent hydrodynamic noise from interfering with the valve leakage test. The obvious method for dealing with this type of problem would be to filter any hydrodynamic pressure noise from the pressure transducer signal using a fast Fourier series transform or an electronic filter. Valve leakage would then be determined as a function of the filtered signal. However, this conventional method would require a series of complex calculations by the microcontroller, resulting in reduced efficiency due to the processing load, and possibly requiring a more sophisticated, expensive microcontroller. The present invention provides a much simpler and more elegant method for minimizing hydrodynamic pressure noise interference with a valve leakage test that obviates the need for complex calculations and a sophisticated microcontroller.

SUMMARY OF THE INVENTION

In accordance with the present invention, a method and apparatus are provided for minimizing hydrodynamic pressure noise interference with a valve leakage test conducted upon a plurality of valves within a pump assembly. A pressure sensor within the pump assembly produces a signal indicative of hydrodynamic pressure level in fluid distal of one of the valves of the pump. Within the pump assembly, a microcontroller receives the signal produced by the pressure sensor. Memory means are included in the microcontroller for storing program instructions that control the microcontroller, causing it to determine whether the valve leakage test should be conducted. Specifically, the microcontroller responds to the programmed instructions to function as sampling means, testing means, and timing means.

Prior to conducting the valve leakage test, the sampling means samples the hydrodynamic pressure level in the fluid at a frequency that is substantially greater than that of the hydrodynamic noise. The testing means then determines if the hydrodynamic pressure level is above a predetermined threshold. If so, the timing means suppresses the valve leakage test until the hydrodynamic pressure noise level falls below the predetermined threshold for a predefined time interval. If this condition fails to occur within the predefined time interval, the timing means triggers an alarm.

A method including steps generally consistent with the functions implemented by the elements of the apparatus described above represents a further aspect of this invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
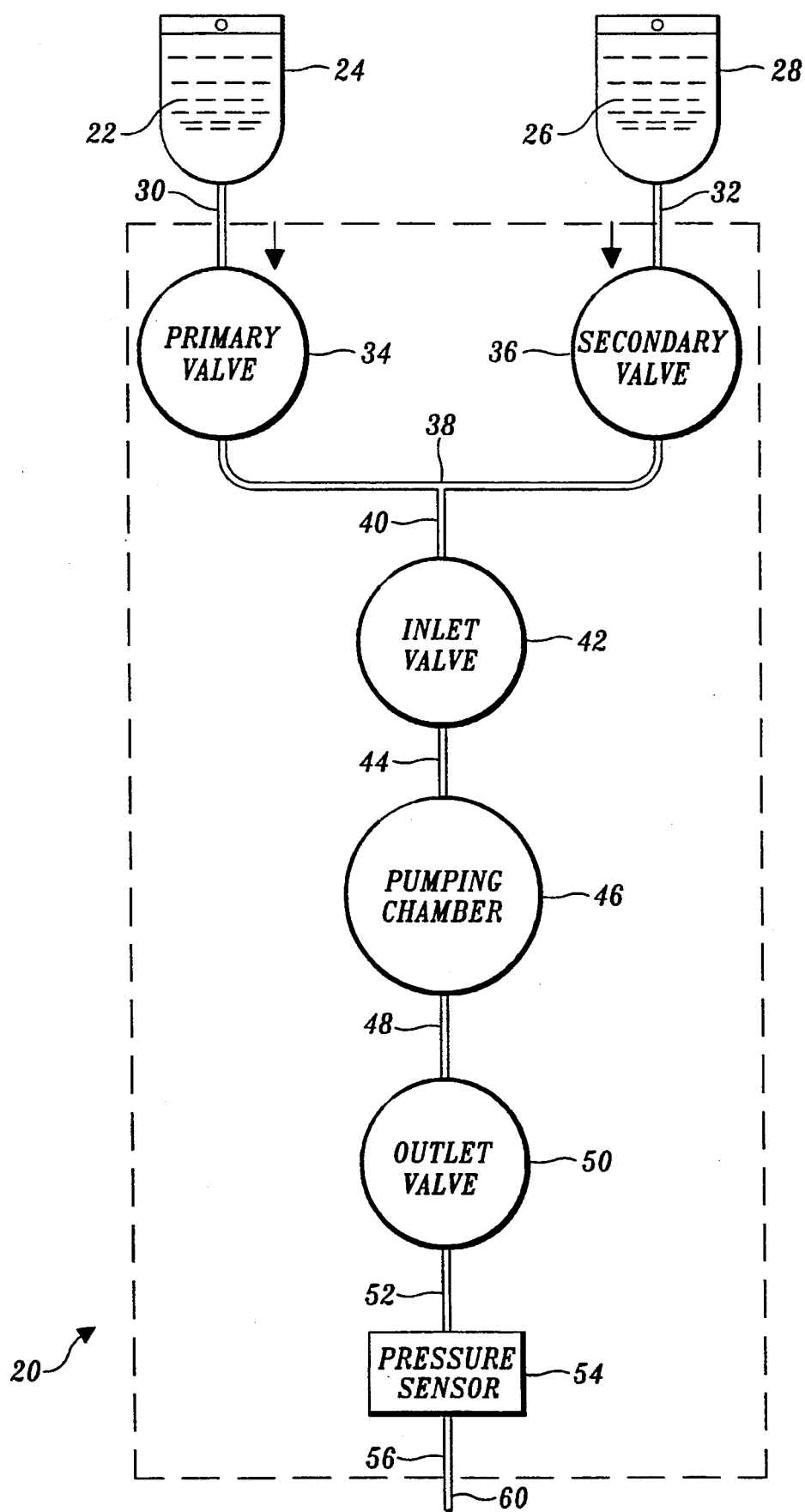
FIG. 1 schematically illustrates the flow path of a liquid through a pump assembly periodically employing a valve leakage test.

A flow diagram for a pump apparatus 20 used to administer liquids intravenously to a patient is shown schematically in FIG. 1. Pump apparatus 20 selectively pumps a first fluid 22, which is supplied from a reservoir bag 24, or a second fluid 26, supplied from a reservoir bag 28. Both reservoir bags 24 and 28 are typically elevated above pump apparatus 20, so that the first and second fluids freely flow downwardly toward the pump assembly. A supply line 30 connects reservoir bag 24 in fluid communication with a primary valve 34, and similarly, a supply line 32 connects reservoir bag 28 in fluid communication with a secondary valve 36. Primary valve 34 and secondary valve 36 are both disposed within pump assembly 20 and are selectively controlled to permit either the first liquid or the second liquid to enter a manifold line 38, which connects both the primary and secondary valves to an inlet passage 40. The inlet passage connects to an inlet valve 42. The inlet valve selectively enables fluid flow into a pumping chamber 46 through a passage 44.

A passage 48 connects the outlet of the pumping chamber to an outlet valve 50, which selectively controls fluid flow from pumping chamber 46. The outlet valve is connected through a delivery passage 52 to a pressure sensor 54, which is connected through a delivery passage 56 to a delivery tube 60. The pressure sensor produces a signal indicative of the pressure of fluid within the delivery passage 52 and is used to detect leakage from the pump apparatus; to determine if inlet valve 42 or outlet valve 50 is leaking; and to determine whether primary valve 34 or secondary valve 36 is leaking. Pressure sensor 54 is also used to determine if hydrodynamic pressure noise would interfere with a valve leakage test conducted by the pump assembly. In the preferred embodiment, pressure sensor 54 comprises a strain gage (not separately shown) that is biased to a positive DC voltage level, so that its output signal is able to indicate pressures less than ambient. The strain gage pressure sensor thus typically produces an AC signal indicative of the pressure levels distal of the outlet valve by varying above and below a DC offset voltage that is equal to the sum of the DC offset provided the device and any DC shift caused by substantially constant pressure in the output line of the pumping device. These two portions of the signal are referred to below respectively as its AC and DC components.

From FIG. 1, it will be apparent that a leak in either primary valve 34 or secondary valve 36 could permit either the first or second fluid, respectively, to flow into manifold line 38 when the presence of fluid from the nonselected source is not desired. Such leakage could potentially cause a dangerous amount of medicinal fluid to be injected into a patient. In addition, any leakage through inlet valve 42 or outlet valve 50 or from pump apparatus 20 could either reduce the effective pumping rate of medicinal fluid into a patient, or permit fluid flow through connected delivery tube 60 when pump apparatus is supposed to be inoperative. However, it is also apparent that any movement of the delivery tube 60 or the reservoir bags 24 and 28 will induce a pressure in the delivery tube that can affect the signal produced by pressure sensor 54 and interfere with the valve leakage test conducted on inlet valve 42, outlet valve 50, primary valve 34, and secondary valve 36. As a result, a false alarm indicating valve leakage could issue, interrupting the flow of medicinal fluid to the patient unnecessarily. Such interference could have a potentially harmful effect.

Figure 2:
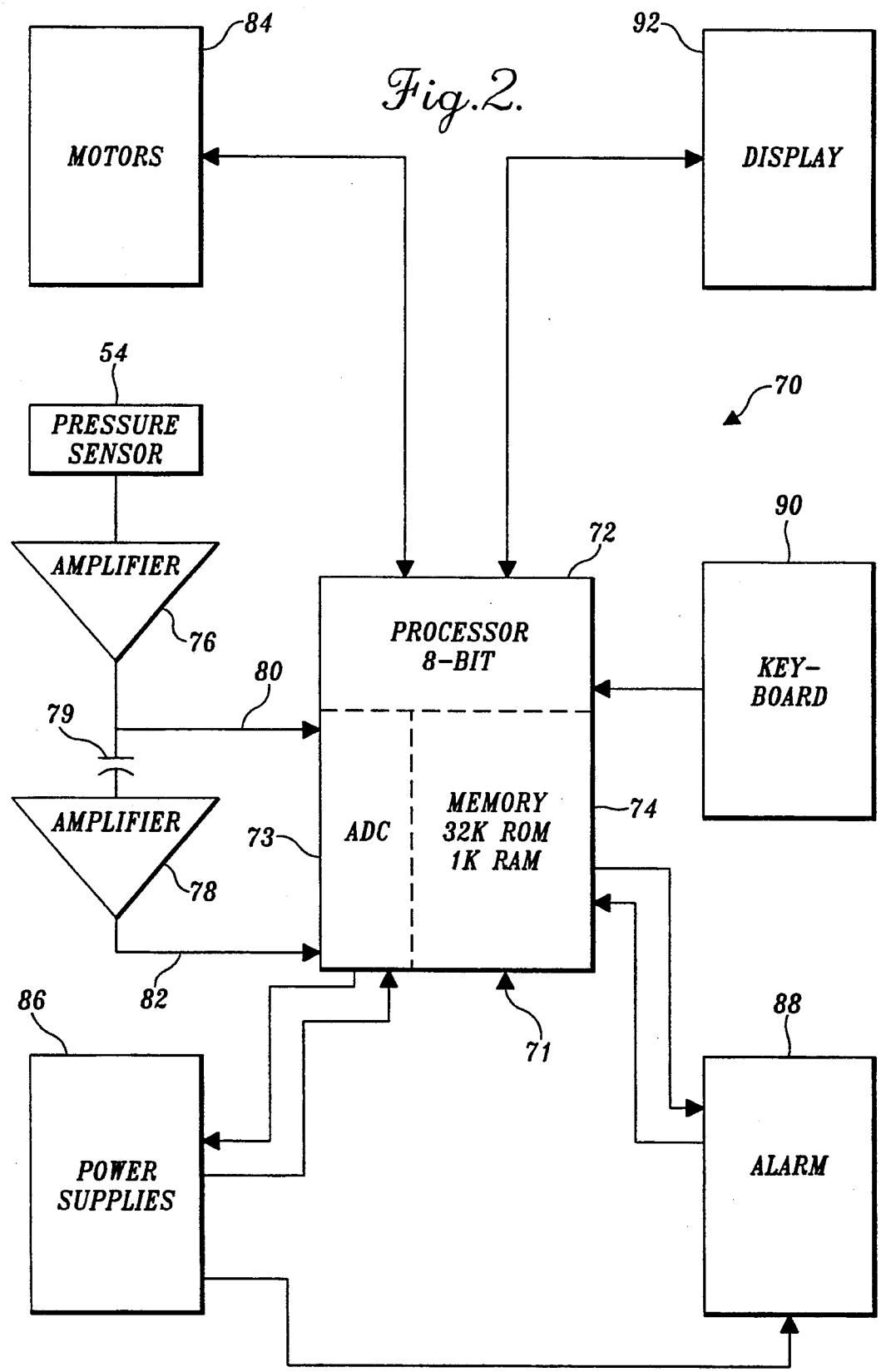
FIG. 2 is an electrical schematic block diagram of a control unit employed in the pump assembly.

Referring now to FIG. 2, a control unit 70 is shown that is used to control pump assembly 20. Control unit 70 contains a microcontroller 71 programmed to effect operation of the pump assembly to deliver a selected one of the first and second medicinal fluids to a patient at a defined rate. More specifically in regard to the present invention, microcontroller 71 is programmed to minimize the likelihood of hydrodynamic pressure noise interfering with leakage test conducted of the inlet and outlet valves, and of the primary and secondary valves. The microcontroller comprises a microprocessor 72 and a memory 74. The memory includes both read only memory (ROM) and random access memory (RAM) (neither separately shown). The microprocessor responds to programmed instructions stored in ROM and maintains values temporarily in RAM of memory 74, associated with microprocessor 72.

A key aspect of the present invention comprises the use of output signals from pressure sensor 54. Pressure sensor 54 produces a signal indicative of hydrodynamic pressure noise. The signal produced by the pressure sensor is amplified by an amplifier 76, which has a relatively low-gain, producing an analog signal 80 that includes both the AC component and DC components discussed above. This low gain analog signal is input to an analog-to-digital converter (ADC) 73 comprising microcontroller 71. The analog signal AC coupled through a capacitor 79 to a second higher gain amplifier 78, producing a high-gain analog signal 82 including only an AC component. Hydrodynamic pressure noise detected by pressure sensor 54 is better indicated by the high-gain analog signal than it is in low-gain signal 80. The high-gain signal is also received by the ADC within microcontroller 71. The ADC within microcontroller 71 digitizes the low-gain and high-gain analog signals and the corresponding digital values are stored in the memory 74. For purposes of simplifying this discussion, the digital value corresponding to the low-gain analog signal is referred to as the "DC-coupled signal" or "low-gain pressure level," and the digital value corresponding to the high-gain analog signal is referred to as the "AC-coupled signal" or "high-gain pressure level."

Also connected to microprocessor 72 are motors 84, a power supply 86, an alarm 88, a keyboard 90, and a display 92. Alarm 88 and display 92, which can selectively produce visual and/or audible alerts, are energized when fault conditions are detected, such as a leak in one of the valves or persistence of hydrodynamic pressure noise.

Stored in ROM within memory 74 are valve leak detection algorithms and an algorithm for minimizing the possibility of hydrodynamic pressure noise interference. The valve leak detection algorithms are disclosed in commonly assigned U.S. Pat. No. 5,000,664, the disclosure and drawings of which are specifically incorporated herein by reference. These algorithms are implemented by microcontroller 71.

The valve leak detection algorithm causes the microcontroller to implement the following valve leakage test, first on the input and output valves, followed by the primary and secondary valves. Leakage in the inlet valve 42 or outlet valve 50 is detected by first closing both primary valve 34 and secondary valve 36. Then, inlet valve 42 and outlet valve 50 are opened to equalize the pressure inside pump assembly 20 and the delivery tube 60. Once the pressure is equalized, the inlet and outlet valves are closed, and fluid is pressurized in pumping chamber 46 for a predetermined period of time. The outlet valve is opened. If a pressure pulse having an amplitude less than a predetermined level is detected by pressure sensor 54 downstream of the outlet valve when it is opened, either the inlet or outlet valve has leaked.

Primary valve 34 and secondary valve 36 are checked for leakage by first pressurizing fluid in pumping chamber 46 as described above; and then opening the inlet valve. The fluid then trapped in the pump assembly 20 is pressurized for a period of time before closing inlet valve 42. The outlet valve 50 is then opened and pressure sensor 54 is used to detect a pressure pulse propagating downstream of the outlet valve. If a pressure pulse of less than the predetermined magnitude is detected, one of the primary or secondary valves is leaking.

Figure 3:
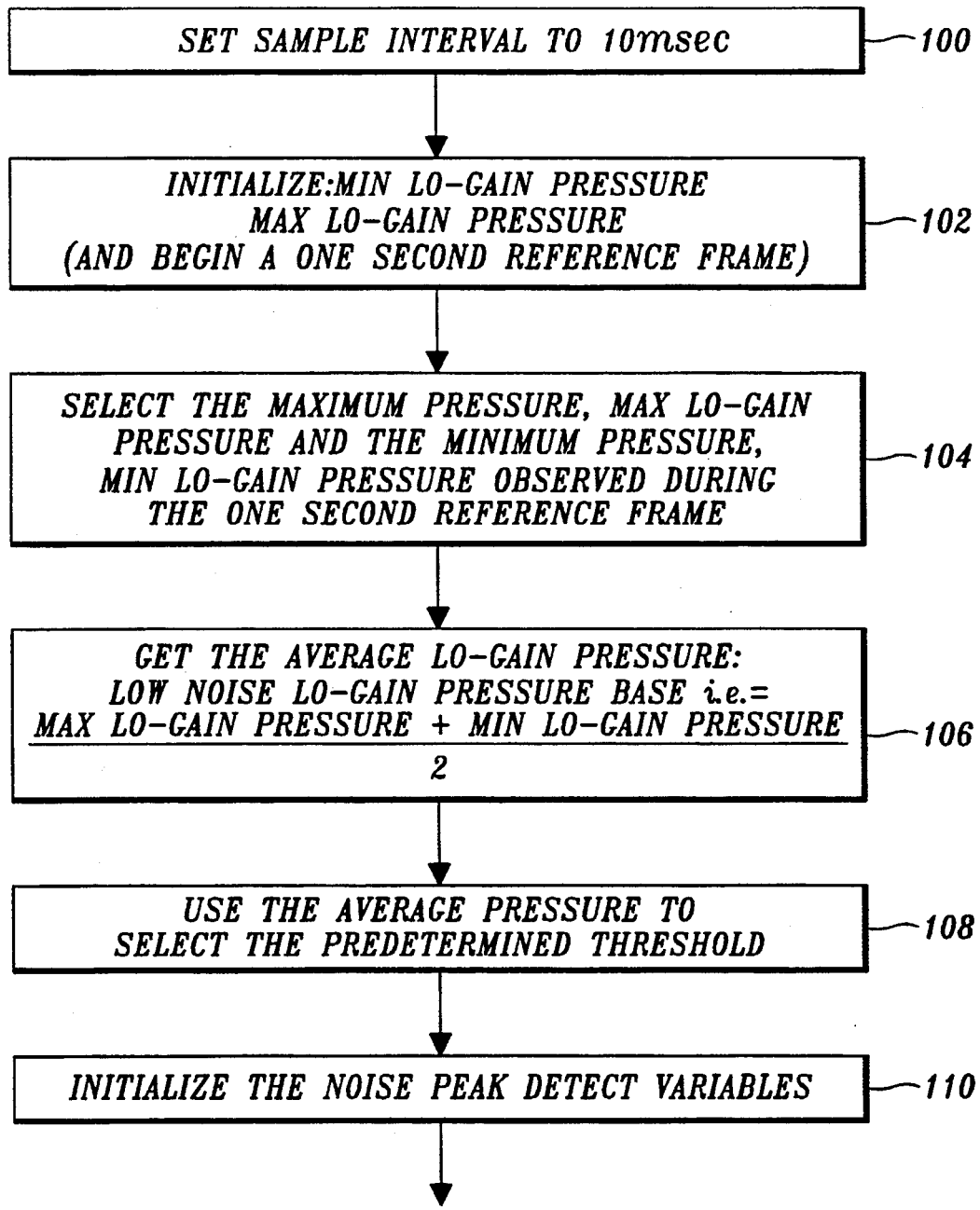
FIGS. 3 and 4 is a flow chart that illustrates the logic used for determining hydrodynamic pressure noise so as to minimize its effect on valve leakage tests.
Figure 4:
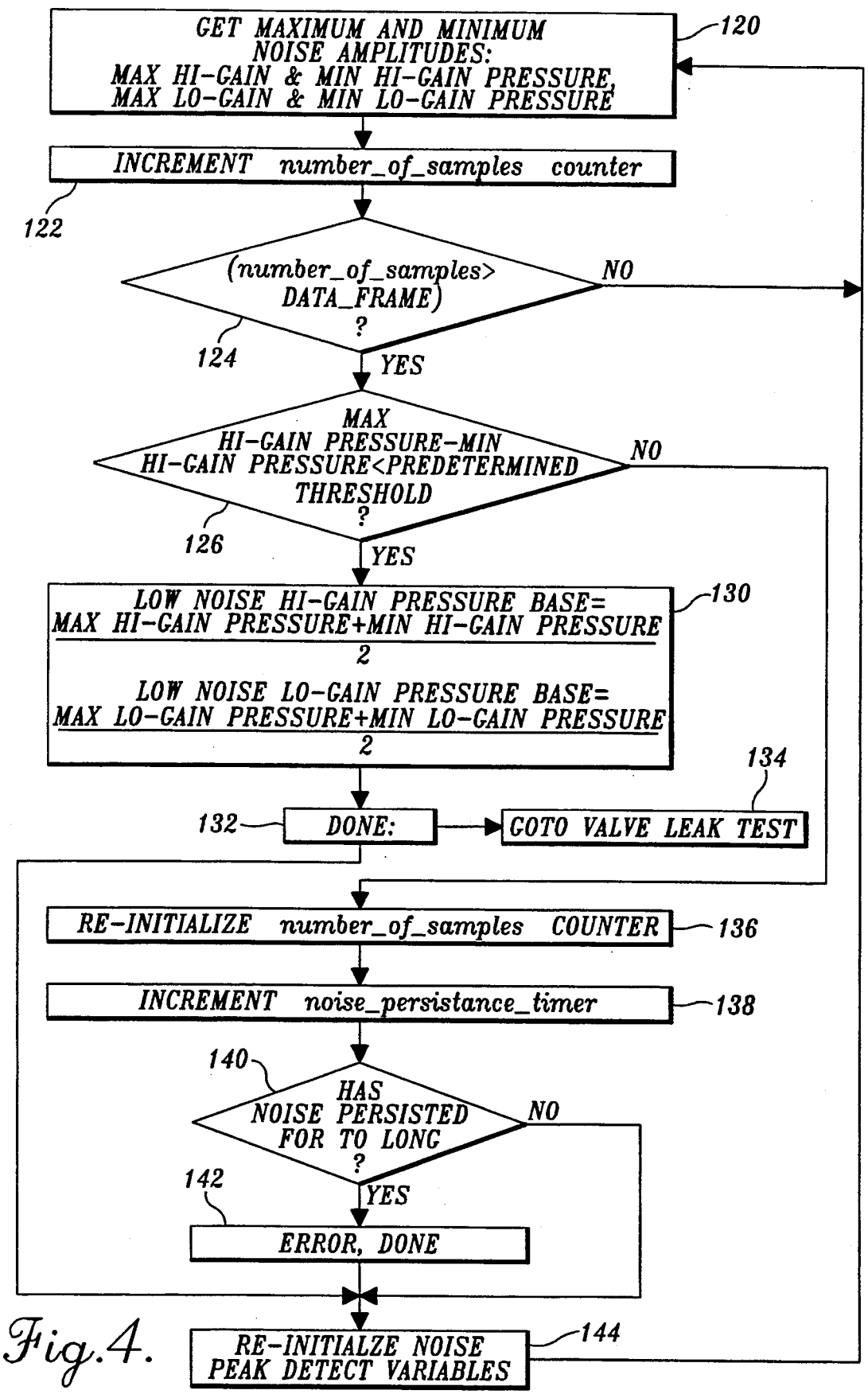

The algorithm of the present invention greatly minimizes the chance that hydrodynamic noise might interfere with the valve leakage test described above. The logic implemented in this algorithm is shown in FIG. 3. The algorithm is time interrupt driven, hence, it does not begin until a valve leakage test has been initiated. As described above, to detect leakage in inlet valve 42 and outlet valve 50, both valves must be closed and the fluid must be pressurized within pumping chamber 46. After one second of continuous pressurization within the pumping chamber, an interrupt initiates the algorithm of the present invention.

As shown in FIG. 3, the algorithm begins at a block 100 where a sample interval is set for 10 milliseconds. The logic then proceeds to a block 102, where values for a minimum and a maximum low-gain pressure level are initialized to 255 and zero, respectively; and a one-second reference frame begins. Proceeding to a block 104, microprocessor 72 determines maximum and minimum low-gain pressure levels. The logic then proceeds to block 106, where an average low-gain pressure level is calculated based upon the DC-coupled signal. Although in block 106 the average low-gain pressure level is calculated by simply dividing the sum of the maximum and minimum low-gain pressure levels by two, various other methods, such as determining a running average, can be used instead.

Proceeding now to block 108, a predetermined threshold for noise is selected as a function of the average low-gain pressure level just determined. In the preferred embodiment, a look-up table is used for this purpose, although the reference pressure can also be calculated as a function of the average pressure level just measured. The relationship of the predetermined thresholds and the average low-gain pressure levels stored in this look-up table is determined based on empirical data. The present preferred embodiment is programmed so that if the average low-gain pressure level is less than 1 psi, the predetermined threshold is set to 150 mV; if the average low-gain pressure level is greater than or equal to 1 psi, but less than 2 psi, the predetermined threshold is set to 125 mV, and so on. Once the predetermined threshold has thus been established, the logic then continues to a block 110, where the maximum low-gain and high-gain pressure levels are again initialized to zero.

In a block 120, a half-second data frame begins. During this and any successive half-second data frames, a number of samples is taken to determine both maximum and minimum low-gain and high-gain pressure levels. A counter keeps track of the number of samples taken during the half-second data frame to determine the duration of the data frame. The frequency at which the samples are taken must be at least twice the expected maximum frequency of the hydrodynamic pressure noise detected by pressure sensor 54, to satisfy the Nyquist theorem. Empirical data has demonstrated that the maximum frequency for hydrodynamic noise is about 10 Hz. Preferably, a sample of the hydrodynamic pressure is taken at 10 millisecond intervals, corresponding to a sampling frequency of about 100 Hz. However, both the low-gain and the high-gain pressure levels are sampled.

Referring to a block 122, once samples of the low-gain and high-gain pressure levels are taken, the number of samples counted is incremented. Proceeding to a decision block 124, the logic determines if the number of samples counted exceeds the expected maximum number of samples per half-second data frame. If the results are negative, the logic returns to block 120 and another set of samples is obtained. The sampling continues until the number of samples exceeds the expected number per half-second data frame, causing the logic to proceed to a decision block 126. In decision block 126, the logic determines if the high-gain pressure level is less than the predetermined threshold. If the result is positive, the hydrodynamic pressure noise is at an acceptable level and the valve leakage test can continue. First, however, a reference baseline for pressure must be established for use in the valve leakage test. The reference baseline values are the average values of the maximum and minimum high-gain pressure levels, obtained by dividing the sum of the maximum and minimum values for these variables that were determined in the current data frame, by two. Again, alternative techniques can be used for computing these averages, as is well know to those of ordinary skill in the art. Once the reference baseline pressures are established, the logic proceeds to a block 132, and the valve leakage test is enabled to proceed in block 134.

However, if the result in decision block 126 is negative, the hydrodynamic pressure noise is unacceptable, and the valve leakage test is suppressed for the duration of the next half-second data frame. The logic proceeds to a block 136, where the number of samples counter is reinitialized to zero for use in the next half-second data frame. A timer is used to gage the time during which an excessive, i.e., an unacceptable hydrodynamic pressure noise level has persisted. In block 138, this noise persistence timer is incremented for each half-second data frame during which the high-gain pressure level exceeds the predetermined threshold. The logic then proceeds to a decision block 140, wherein the logic determines if the hydrodynamic pressure noise level has persisted for too long. In other words, the logic determines whether the hydrodynamic pressure noise has persisted for more than a predefined noise persistence time interval.

The predefined noise persistence time interval is equivalent to the maximum number of half-second data frames the algorithm is allowed to evaluate hydrodynamic pressure noise. For the preferred embodiment, the maximum number of half-second data frames allowed is 20, and the predefined noise persistence time interval is thus 10 seconds. If the noise persistence timer exceeds a count of 20, i.e. if the noise has persisted for more than 10 seconds, the logic proceeds to a block 142. In block 142, an error flag is set and alarm 88 is triggered, notifying the operator of the noise fault condition.

However, if the results of decision block 140 are negative, the hydrodynamic pressure noise has not persisted for more than a predefined time interval, and the logic proceeds to a block 144. In block 144, the maximum values for both the low-gain and high-gain pressure levels are reinitialized to zero; and minimum values for both the low-gain and high-gain pressure levels are reinitialized to 255. The logic then returns to block 120, where the next half-second data frame of sampling begins. During these successive data frame measurements, the valve leakage test is suppressed, because unacceptable hydrodynamic pressure noise persists. The valve leakage test is thus not allowed to continue until the amplitude of the maximum high-gain pressure level is below the predetermined threshold during a data frame. If this condition fails to occur within the predefined noise persistence time interval, alarm 88 and display 92 are energized.

Primary valve 34 and secondary valve 36 are checked for leakage in a slightly different manner than the inlet and outlet valves, but substantially the same technique is used to minimize the chance that hydrodynamic pressure noise might interfere with the leakage tests performed on these valves. Primary valve 34 and secondary valve 36 are checked for leakage by first pressurizing fluid in pumping chamber 46 and then opening the inlet valve. The fluid then trapped in the pump assembly 20 is pressurized for a period of time before closing inlet valve 42. Consequently, the algorithm in accordance with the present invention begins after the fluid trapped in pump assembly 20 has been pressurized for a one-second reference frame and proceeds exactly as described above.

While the preferred embodiment of the invention has been illustrated and described, it will be appreciated that various changes can be made therein without departing from the spirit and scope of the invention. Accordingly, it is not intended that the scope of the invention be limited by the disclosure of the preferred embodiment, instead, the invention should be determined entirely by reference to the claims that follow.

The embodiments of the invention in which an exclusive property or privilege is claimed are defined as follows:

1. A method for minimizing hydrodynamic pressure noise interference with a valve leakage test comprising the steps of:
    (a) sampling a hydrodynamic pressure level prior to conducting a valve leakage test;
    (b) determining if the hydrodynamic pressure level is above a predetermined threshold; and
    (c) suppressing the valve leakage test until the hydrodynamic pressure level is below the predetermined threshold for a predefined time interval.

2. The method of claim 1, further comprising the steps of:
    (a) determining a reference pressure; and
    (b) as a function of the reference pressure, selecting the predetermined threshold.

3. The method of claim 2, wherein the predetermined threshold decreases as the reference pressure increases.

4. The method of claim 2, wherein the step of determining the reference pressure comprises the steps of:
    (a) sampling the hydrodynamic pressure level over a sampling interval to determine a minimum and maximum value; and
    (b) as a function of the minimum and maximum values, determining the reference pressure.

5. The method claim 1, wherein the step of sampling occurs at a frequency that is substantially greater than that of the hydrodynamic noise.

6. The method of claim 1, wherein an alarm is triggered if the hydrodynamic pressure fails to fall below the predetermined threshold within a predefined persistence time interval.

7. In a pump assembly that includes a plurality of valves and has the capacity to conduct a valve leakage test upon the plurality of valves, an apparatus to prohibit hydrodynamic pressure noise from interfering with the valve leakage test, comprising:
    (a) a pressure sensor that produces a signal indicative of a hydrodynamic pressure level of fluid distal of one of the valves of the pump; and
    (b) a microcontroller electronically coupled to the pressure sensor to receive the signal indicative of the hydrodynamic pressure level, said microcontroller including memory means for storing program instructions, which control the microcontroller so that it comprises:
        (i) sampling means for sampling the hydrodynamic pressure level;
        (ii) testing means for determining if the hydrodynamic pressure level is above a predetermined threshold; and
        (iii) timing means for suppressing the valve leakage test until the hydrodynamic pressure level is below the predetermined threshold for a predefined time interval.

8. The apparatus of claim 7, wherein the signal produced by the pressure sensor includes an AC component and a DC component.

9. The apparatus of claim 7, wherein the microcontroller is controlled so that it includes means for selecting the predetermined threshold.

10. The apparatus of claim 7, wherein the sampling means samples the hydrodynamic pressure level at a frequency that is substantially greater than that of the hydrodynamic noise.

11. The apparatus of claim 7, wherein the timing means triggers an alarm if the hydrodynamic pressure level fails to fall below the predetermined threshold within a predefined persistence time interval.

12. A method for suppressing a valve leakage test in a pump having an inlet valve and an outlet valve when there is hydrodynamic pressure noise interference, comprising the steps of:
    (a) prior to conducting the valve leakage test, sampling a hydrodynamic pressure level distal of the outlet valve at a frequency that is substantially greater than a frequency of the hydrodynamic noise;
    (b) selecting a predetermined threshold as function of reference pressure;
    (c) determining if the hydrodynamic pressure level is above the predetermined threshold; and (d) suppressing the valve leakage test until the hydrodynamic pressure level is less than the predetermined threshold for a predefined time interval.

13. The method of claim 12, wherein the step of selecting the predetermined threshold as a function of the reference pressure, comprises the steps of:
   (a) sampling the hydrodynamic pressure level over a sampling interval to determine a minimum and maximum value; and
   (b) as a function of the minimum and maximum values, determining the reference pressure.

14. The method of claim 12, wherein the selecting step (b) selects a predetermined threshold that decreases as the reference pressure increases.

15. The method of claim 12, wherein an alarm is triggered if the hydrodynamic pressure level fails to fall below the predetermined threshold within a predefined persistence time interval.

16. The method of claim 12, wherein the step of sampling is conducted over successive data frames, each data frame having a predefined duration, until the sampled hydrodynamic pressure level is less than the predetermined threshold during a complete data frame, or until the predetermined time interval has elapsed, whichever occurs first.

17. A method for minimizing hydrodynamic pressure noise interference with a leakage test comprising the steps of:
   (a) sampling a hydrodynamic pressure level prior to conducting a leakage test of a closed system;
   (b) determining if the hydrodynamic pressure level is above a predetermined threshold; and
   (c) suppressing the leakage test until the hydrodynamic pressure level is below the predetermined threshold for a predefined time interval.

18. The method of claim 17, further comprising the steps of:
   (a) determining a reference pressure; and
   (b) as a function of the reference pressure, selecting the predetermined threshold.

19. The method of claim 18, wherein the predetermined threshold decreases as the reference pressure increases.

20. The method of claim 18, wherein the step of determining the reference pressure comprises the steps of:
   (a) sampling the hydrodynamic pressure level over a sampling interval to determine a minimum and maximum value; and
   (b) as a function of the minimum and maximum values, determining the reference pressure.

21. The method of claim 17, wherein the step of sampling occurs at a frequency that is substantially greater than that of the hydrodynamic noise.

22. The method of claim 17, wherein an alarm is triggered if the hydrodynamic pressure fails to fall below the predetermined threshold within a predefined persistence time interval.

23. In a closed system that includes a plurality of valves and has the capacity to conduct a leakage test upon the plurality of valves, an apparatus to prohibit hydrodynamic pressure noise from interfering with the leakage test, comprising:
   (a) a pressure sensor that produces a signal indicative of a hydrodynamic pressure level of fluid distal of one of the valves of the closed system; and
   (b) a microcontroller electronically coupled to the pressure sensor to receive the signal indicative of the hydrodynamic pressure level, said microcontroller including memory means for storing program instructions, which control the microcontroller so that it comprises:
      (i) sampling means for sampling the hydrodynamic pressure level;
      (ii) testing means for determining if the hydrodynamic pressure level is above a predetermined threshold; and
      (iii) timing means for suppressing the leakage test until the hydrodynamic pressure level is below the predetermined threshold for a predefined time interval.

24. The apparatus of claim 23, wherein the signal produced by the pressure sensor includes an AC component and a DC component.

25. The apparatus of claim 24, wherein the microcontroller is controlled so that it includes means for selecting the predetermined threshold as a function of the DC component of the signal produced by the pressure sensor.

26. The apparatus of claim 23, wherein the sampling means samples the hydrodynamic pressure level at a frequency that is substantially greater than that of the hydrodynamic noise.

27. The apparatus of claim 23, wherein the timing means triggers an alarm if the hydrodynamic pressure level fails to fall below the predetermined threshold within a predefined persistence time interval.

* * * * *

UNITED STATES PATENT AND TRADEMARK OFFICE
CERTIFICATE OF CORRECTION

PATENT NO. : 5,404,748
DATED : April 11, 1995
INVENTOR(S) : W.L. Jimison et al.

It is certified that error appears in the above-indentified patent and that said Letters Patent is hereby corrected as shown below:

Item

[21]    Appl. No.    "45,003" should read --145,003--

Signed and Sealed this

Eighth Day of August, 1995

Attest:

BRUCE LEHMAN

*Attesting Officer*    *Commissioner of Patents and Trademarks*